United States Patent [19]

Shiozaki

[11] Patent Number: 4,905,964
[45] Date of Patent: Mar. 6, 1990

[54] SWIVELABLE CONNECTOR FOR TUBULAR CONDUITS
[75] Inventor: Kotaro Shiozaki, Susono, Japan
[73] Assignees: Fujipura Seiko Co., Ltd., Shizuoka; Daicel Hüls Ltd., Tokyo, both of Japan
[21] Appl. No.: 259,323
[22] Filed: Oct. 18, 1988
[30] Foreign Application Priority Data
  Aug. 29, 1986 [JP] Japan .................. 61-20300
  Oct. 19, 1987 [JP] Japan .................. 62-263617
[51] Int. Cl.⁴ ............................................. F16L 37/28
[52] U.S. Cl. ................................. 251/149.6; 285/319
[58] Field of Search ............... 251/149.6; 285/39, 319

[56] References Cited
U.S. PATENT DOCUMENTS

| | | | |
|---|---|---|---|
| 2,327,611 | 8/1943 | Scheiwer | 251/149.6 X |
| 3,601,361 | 8/1971 | Hundhausen et al. | 285/319 X |
| 3,873,062 | 3/1975 | Johnson et al. | 251/149.6 |
| 4,524,995 | 6/1985 | Bartholomew | 285/54 |
| 4,601,497 | 7/1986 | Bartholomew | 285/319 |
| 4,647,082 | 3/1987 | Fournier et al. | 285/319 X |
| 4,730,856 | 3/1988 | Washizu | 285/319 |
| 4,781,400 | 11/1988 | Cunningham | 285/319 X |

Primary Examiner—John Rivell
Attorney, Agent, or Firm—McAulay Fisher Nissen & Goldberg

[57] ABSTRACT

A swivelable connector for use with tubular conduits, comprising a first tubular connector member, a second tubular connector member insertable in the first member, an annular seal arranged between the members, and a resilient retainer carried in the first tubular connector member to retain the second tubular connector member in the first member. The second tubular connector member has an annular groove in which pawls of the retainer are engaged, and the first tubular connector member has apertures in which the outer portions of the pawls can be inserted to allow a resilient movement thereof and to hold the connection member in position.

20 Claims, 10 Drawing Sheets

SWIVELABLE CONNECTOR FOR TUBULAR CONDUITS

BACKGROUND OF THE INVENTION

1. Field of the Invention

The present invention relates to a quick connect swivelable connector for tubular conduits.

2. Description of the Related Art

Swivelable connectors are used in many applications for connecting hoses for supplying a fluid such as water or oil, and conventionally, connectors of the threaded type are typically used. Such connectors, however, require skill and time for assembly, and thus simpler connectors are demanded.

U.S. Pat. Nos. 4,524,995 and 4,601,497, granted to Bartholomew on June 25, 1985 and July 22, 1986, respectively, disclose a quick connect swivelable connector comprising a first tubular connector member (housing), a second tubular connector member (a tubular conduit) inserted in the first tubular connector member and having an annular projection, a sealing means between the first and second tubular connector members, and a resilient retainer secured to the first tubular connector member to engage with the annular projection of the second tubular connector member. The resilient retainer preferably comprises a pair of snapping jaws. In this connector, assembly is easily carried out by securing the resilient retainer to the first tubular connector member and then inserting the second tubular connector member in the resilient retainer and in the first tubular connector member until the annular projection of the second tubular connector member passes beyond the resilient retainer, whereby the second tubular connector member cannot be disconnected from the first tubular connector member.

The problem in this arrangement is the provision of the annular projection of the second tubular connector member. It is, of course, necessary to enlarge a portion of the first tubular connector member to allow the insertion of the second tubular connector member in the first tubular connector member, but the annular projection of the second tubular connector member necessitates a greater enlargement of a corresponding portion of the first tubular connector member. Therefore, preferably the annular projection is eliminated, to obtain a compact connector.

In this aspect, an outer projection is naturally provided on the outer surface of a tubular connector member, i.e., a pipe, when it is desired to provide a profiled engaging means on the outer surface of the pipe. But conversely, it appears rare to provide a recess or a groove on the outer surface of the pipe, since the recess or groove causes a reduction in the thickness of the pipe wall, and thus there have been no proposals to provide a recess or a groove in place of the annular projection.

Further, the resilient retainer must spread in the first tubular connector member when the second tubular connector member is inserted in the first tubular connector member and therefore, the resilient retainer also necessitates an enlargement of the first tubular connector member.

In the principle of the above-described swivelable connector, it is possible to disconnect the once retained second tubular connector member from the first tubular connector member by manually spreading the resilient retainer. In practice, however, it is difficult to manually spread the resilient retainer, since the resilient retainer is preferably formed of a plastic material with sufficient rigidity to retain the once retained second tubular connector member during subsequent long and severe use.

SUMMARY OF THE INVENTION

An object of the present invention is to provide a swivelable connector which can solve the above described problems, and having a compact shape.

A further object of the present invention is to provide a swivelable connector in which the connector members are disconnectable.

According to the present invention, there is provided a swivelable connector for tubular conduits comprising: a first tubular connector member having a first end portion adapted to be connected to a tubular conduit and a second end portion; a second tubular connector member having a first end portion inserted in the second end portion of the first tubular connector member, a second end portion adapted to be connected to a further tubular conduit, and means for forming an annular groove on the outer surface thereof at the first end portion; an annular sealing means arranged between the first tubular connector member and the second tubular connector member on the side inward from the annular groove; and retaining means carried by the first tubular connector member for resiliently engaging in the annular groove of the second tubular connector member to retain the second tubular connector member in the first tubular connector member.

In the preferred form, the swivelable connector comprises: a first tubular connector member having a first end portion adapted to be connected to a tubular conduit and a second end portion with a means for forming a plurality of apertures therein, said means for forming the apertures including a cylindrical wall at the outer end of the second end portion; a second tubular connector member having a first end portion inserted in the second end portion of the first tubular connector member, a second end portion adapted to be connected to a further tubular conduit, and a means for forming an annular groove on the outer surface thereof at the first end portion; an annular sealing means arranged between the first tubular connector member and the second tubular connector member on the side inward from the annular groove; and retaining means carried in the cylindrical wall of the first tubular connector member for resiliently engaging in the annular groove of the second tubular connector member to retain the second tubular connector member in the first tubular connector member, the retaining means being at least partly insertable in the apertures to thereby allow the retaining means to be resiliently deformed by contact with the outer surface of the second tubular connector member within the first tubular connector member during insertion of the second tubular connector member into the first tubular connector member.

Preferably, the retaining means comprises a cylindrical base portion adapted to fit in the cylindrical wall of the first tubular connector member and a plurality of pawls extending from the cylindrical base portion and resiliently engaging in the annular groove of the second tubular connector member, each of the pawls including a radially extending portion to be inserted in each of the apertures.

Preferably, a cylindrical pawl release member is slidably inserted in the cylindrical base portion of the retaining means and on the second tubular connector member, the cylindrical pawl release member having a tapered tip to radially spread the pawls by driving the cylindrical pawl release member to thereby release the pawls from the annular groove of the second tubular connector member.

BRIEF DESCRIPTION OF THE DRAWINGS

The present invention will become more apparent from the following description of the preferred embodiments with reference to the accompanying drawings, in which.

DESCRIPTION OF THE PREFERRED EMBODIMENTS

Figure 1:
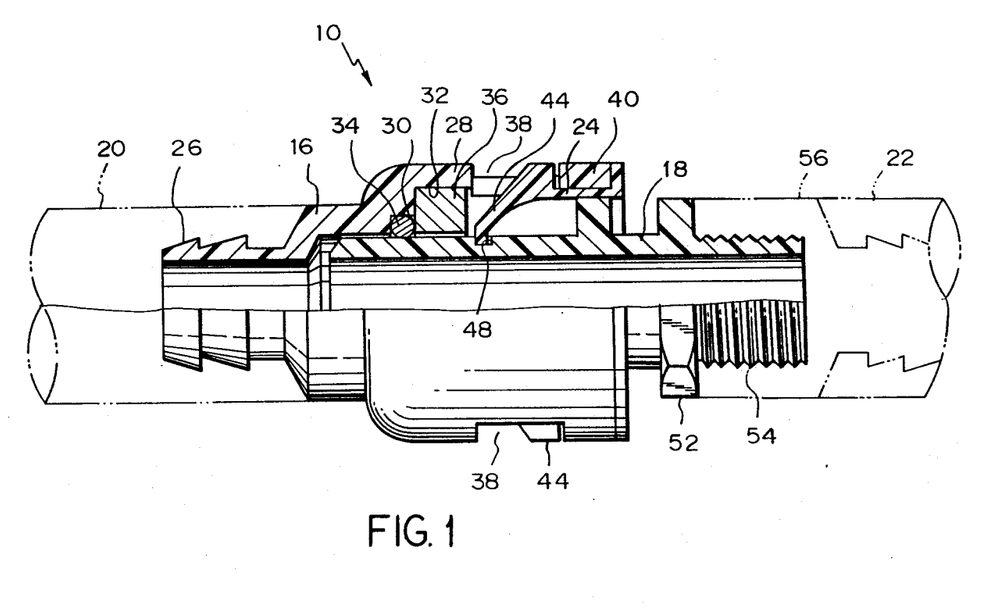
FIG. 1 is a partly sectional view of a swivelable connector according to the first embodiment of the present invention.
Figure 5:
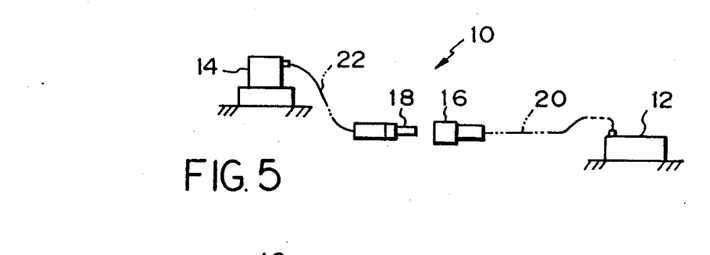
FIG. 5 is a schematic view of the swivelable connector in use.

FIG. 1 shows a swivelable connector 10 according to the first embodiment of the present invention. As shown in FIG. 5, the swivelable connector 10 can be used to connect a fluid supply device 12 and a fluid utility device 14. The swivelable connector 10 comprises a first tubular connector member 16 and a second tubular connector member 18 to which hoses 20 and 22 can be connected, respectively. It will be apparent that the swivelable connector 10 is used to couple the hoses 20 and 22 together, and to this end, a resilient retainer 24 is provided to retain the second tubular connector member 18 in the first tubular connector member 16.

As shown in FIG. 1, the first tubular connector member 16 has at one end portion thereof a hose connecting means 26 adapted to be connected to the hose 20. The other end portion 28 of the first tubular connector member 16 has a larger diameter than that of the one end portion, to allow one end portion of the second tubular connector member 18 to be inserted therein. At an intermediate position in the first tubular connector member 16 are provided stepped groove portions 30 and 32, and an annular seal 34 is carried in the small stepped groove portion 30 to provide a seal between the first tubular connector member 16 and the second tubular connector member 18. A seal support sleeve 36 is press fitted or welded in the large groove portion 32 to firmly hold the annular seal 34.

Figure 2:
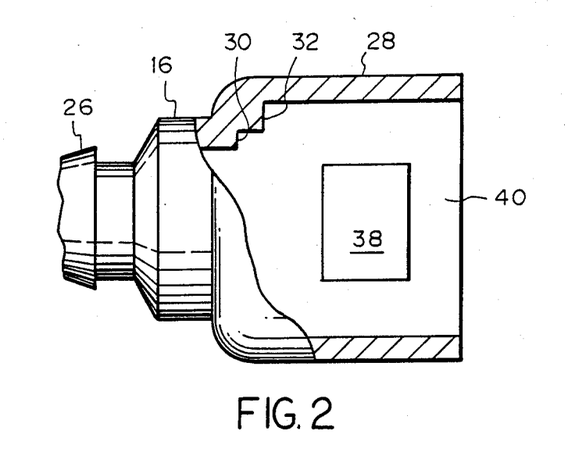
FIG. 2 is a partly sectional view of the first tubular connector member of FIG. 1.

As shown in FIGS. 1 and 2, the first tubular connector member 16 has a pair of diametrically opposed apertures 38 (only one shown in FIG. 2) at the larger end portion 28 thereof, and a cylindrical wall 40 extends integrally with the first tubular connector member 16 at the outer end thereof to delimit one side of the apertures 38.

Figure 3:
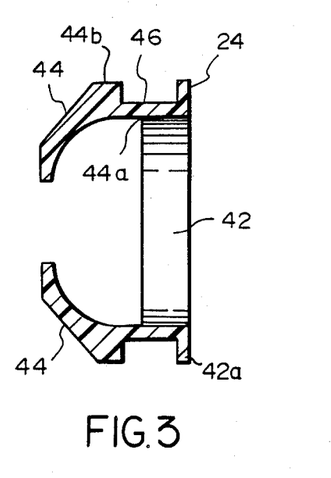
FIG. 3 is a sectional view of the retainer of FIG. 1.
Figure 4:
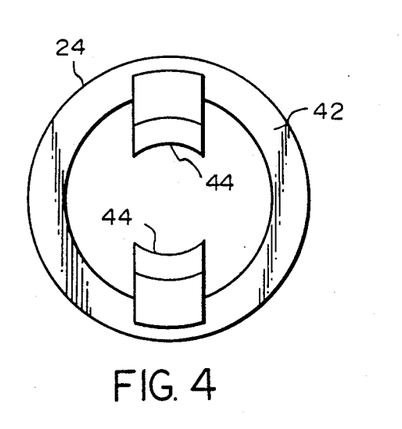
FIG. 4 is a front elevational view of the retainer of FIG. 3.

As shown in FIGS. 1, 3 and 4, the resilient retainer 24 comprises a cylindrical base portion 42 adapted to be carried by the cylindrical wall 40 of the first tubular connector member 16, and a pair of diametrically opposed pawls 44 extending from the cylindrical base portion 42 at the juncture 44a. Each of the pawls 44 has a uniform width, extends generally straight from the juncture 44a for a predetermined length, and includes a radially outward flange 44b. The cylindrical base portion 42 also includes a radially outward flange 42a, to thus form an attachment groove 46 on the outer surfaces of the cylindrical base portion 42 and the pawls 44 between the radially outward flanges 44b and 42a to fit in the cylindrical wall 40 of the first tubular connector member 16.

The free end portion of each of the pawls 44 extends radially inwardly to resiliently engage with the second tubular connector member 18 and has an arc shaped inner edge profile in correspondence with the outer shape of the second tubular connector member 18, to allow the second tubular connector member 18 to rotate when engaged by the resilient retainer 24.

The resilient retainer 24 and the first and second tubular connector members 16 and 18 are made of a plastic material, and thus at least the pawls 44 are resilient. The resilient retainer 24 can be secured to the first tubular connector member 16 by axially driving the resilient retainer 24 before the insertion of the second tubular connector member 18. In this case, the pawls 44 will resiliently deform radially inward with the radially outward flanges 44b in contact with the inner surface of the cylindrical wall 40 of the first tubular connector member 16, and then be restored to the original shape when the radially outward flanges 44b drop in the apertures 38, respectively. In this position, the distance between the inner edges of the pawls 44 is smaller than the diameter of the second tubular connector member 18 so that the pawls 44 can be resiliently spread in response to the insertion of the second tubular connector member 18, the apertures 40 absorbing the outward movement of the pawls 44. Note, however, the axial movement of the resilient retainer 24 is restricted by the attachment groove 46 engaged with the cylindrical wall 40 of the first tubular connector member 16.

Figure 13:
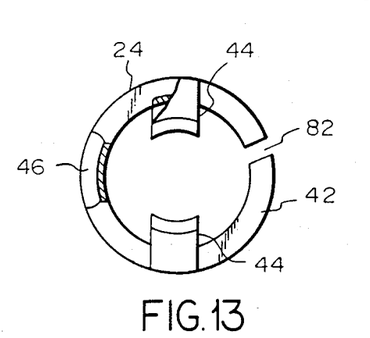
FIG. 13 is a front elevational view of a modified retainer.

The cylindrical base portion 42 is rigid relative to the pawls 44, so that a considerable effort may be necessary to drive the resilient retainer 24 in the cylindrical wall 40 of the first tubular connector member 16. In this aspect, when it is desired to increase the resiliency to facilitate the fitting of the resilient retainer 24 to the first tubular connector member 16, it is possible to form a slit 82 in the cylindrical base portion 42, as shown in FIG. 13.

As shown in FIG. 1, the second tubular connector member 18 has one end portion inserted in the large diameter end portion 28 of the first tubular connector member 18 and the other end portion adapted to be connected to the hose 22. An annular groove 48 is formed on the outer surface of the second tubular connector member 18 at a distance from the inner end thereof greater than the distance between the annular seal 34 and the inner end of the pawls 44 so that the annular seal 34 is effective between the first tubular connector member 16 and the second tubular connector member 18 when the annular groove 48 reaches the pawls 44. The pawls 44 can be resiliently spread by contact with the outer surface of the second tubular connector member 18 when the second tubular connector member 18 is inserted in the first tubular connector member 18 and then be inwardly deformed toward the original position thereof, to thereby engage in the annular groove 48 when the annular groove 48 reaches the pawls 44.

The second tubular connector member 18 also has an annular projection 50 having a diameter almost the same as the inner diameter of the cylindrical base portion 42 of the resilient retainer 24. Therefore, the second tubular connector member 18 is rotatably supported by the annular seal 34 and the cylindrical base portion 42 of the resilient retainer 24 and retained by the pawls 44 engaging in the annular groove 48. In this embodiment, the second tubular connector member 18 has a nut-like hexagon projection 52 and a screw thread 54 at the other end thereof, onto which a nipple 56 can be threaded. The hose 22 is connected to the nipple 56.

With this arrangement, the assembly can be easily and quickly carried out by attaching the resilient retainer 24 to the first tubular connector member 16 and then inserting the second tubular connector member 18 in the first tubular connector member 16 until the pawls 44 engage in the annular groove 48. In this position, the second tubular connector member 18 cannot be separated from the first tubular connector member 16. The outer diameter of the large end portion 28 of the first tubular connector member 16 can be made compact since the pawls 44 are required only to contact the outer surface of the second tubular connector member 18, and it is not necessary for the pawls 44 to further spread to the greater extent as in the prior art arrangement having an annular projection on the outer surface of the second tubular connector member. Also, the apertures 38 allow the radial movement of the pawls 44 in the compact first tubular connector member 16; otherwise the first tubular connector member 16 would have to be enlarged, to provide a substantial clearance between the pawls 44 and the inner surface of the first tubular connector member 16.

Figure 6:
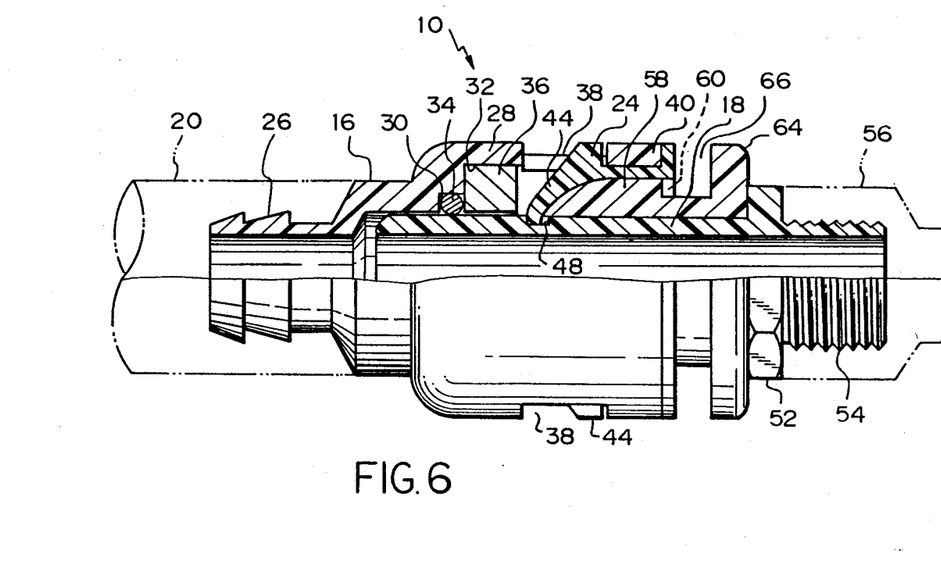
FIG. 6 is a partly sectional view of a swivelable connector according to the second embodiment of the present invention.
Figure 7:
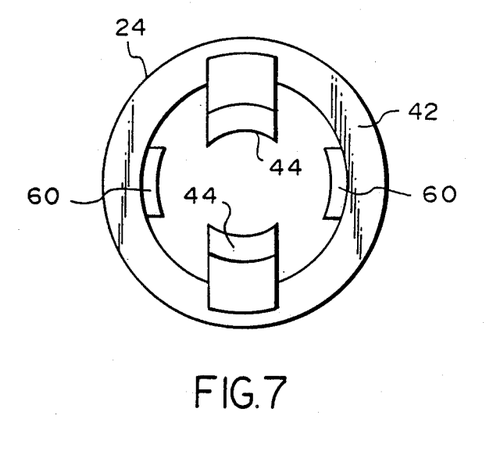
FIG. 7 is a front elevational view of the retainer of FIG. 6.
Figure 8:
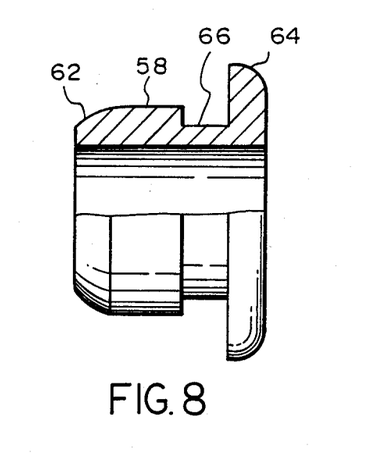
FIG. 8 is a partly sectional view of the pawl releasing tubular member of FIG. 6.

Now referring to FIGS. 6, 7 and 8, the second embodiment of the present invention is described. The same reference numerals are used to represent similar elements throughout the drawings. The swivelable connector 10 comprises a first tubular connector member 16, a second tubular connector member 18, and a resilient retainer 24, generally similar to those of the previous embodiment.

The swivelable connector 10 of the second embodiment comprises a cylindrical pawl release member 58 slidably inserted in the cylindrical base portion 42 of the retainer 24 and on the second tubular connector member 18. The cylindrical pawl release member 58 has a tapered tip 62 which engages with the inner surface of the pawls 44 and radially spreads the pawls 44 when the cylindrical pawl release member 58 is driven toward the pawls 44 to release the pawls 44 from the annular groove 48 of the second tubular connector member 18.

The cylindrical pawl release member 58 includes a manual handling wheel 64 at the outer end thereof to drive the member 58 for a releasing operation. The cylindrical pawl release member 58 also includes an annular groove 66 and the cylindrical base portion 42 of the retainer 24 includes a radially inward tab 60 at the outer end thereof. The cylindrical pawl release member 58 is also made of plastic material and can be driven beyond the radially inward tab 60 into the pawls 44 by the resilient action of the cylindrical pawl release member 58 and the radially inward tab 60, which thus secure the cylindrical pawl release member 58 in position, as shown in FIG. 6. The manual handling wheel 64 is axially spaced from the outer end of the resilient retainer 24 by the annular groove 66, and thus it is possible to drive the cylindrical pawl release member 58 relative to the resilient retainer 24.

This arrangement allows the second tubular connector member 18 to be disconnected from the first tubular connector member 16 without using a special tool to spread the pawls 44 of the resilient retainer 24.

Figure 9:
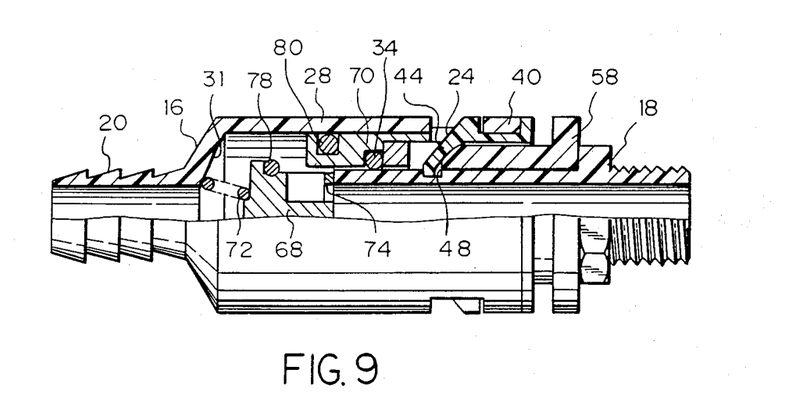
FIG. 9 is a partly sectional view of a swivelable connector according to the third embodiment of the present invention.
Figure 10:
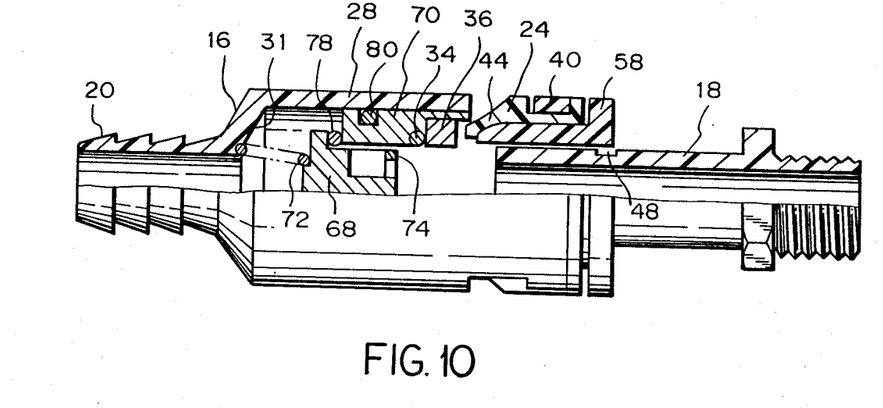
FIG. 10 is a view of the swivelable connector of FIG. 9, in the disconnected condition.
Figure 11:
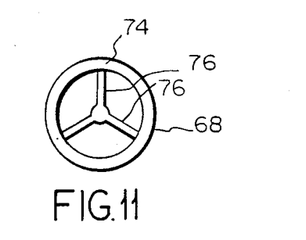
FIG. 11 is a front elevational view of the check valve of FIG. 9.

FIGS. 9, 10, and 11 show the third embodiment of the present invention. The swivelable connector 10 comprises a first tubular connector member 16, a second tubular connector member 18, a resilient retainer 24, and a cylindrical pawl release member 58, generally similar to those of the previous embodiment.

A check valve is provided in the first tubular connector member 16 on the inside relative to the second tubular connector member 18. The check valve comprises a movable valve element 68 in the first tubular connector member 16, a spring 72 urging the valve element 68 toward the second tubular connector member 18, and an annular valve seat 70 in the first tubular connector member 16 to receive the valve element 68. The diameter of the valve element 68 is smaller than the inner diameter of the first tubular connector member 16, and thus the annular space between the valve element 68 and the first tubular connector member 16 constitutes a flow passage. An annular seal 78 is carried by the valve element 68 to engage with the annular valve seat 70.

Figure 12:
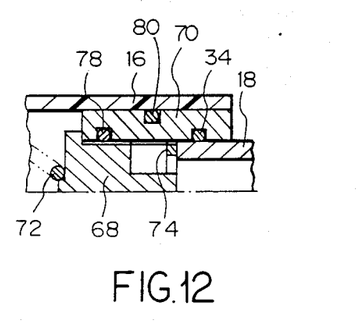
FIG. 12 is a sectional view of a modified valve seat member.

The annular valve seat 70 is constituted by an elongated annular member at the back face thereof. The elongated annular valve seat 70 is intended to carry an annular seal 80 for a sealing between the annular valve seat 70 and the first tubular connector member 16 and the annular seal 34 for a sealing between the annular valve seat 70 and the second tubular connector member 18. Alternately, the annular valve seat 70 can carry three seals, i.e., the annular seals 78, 80, and 34, as shown in FIG. 12.

The annular valve seat 70 is a separate member from the first tubular connector member 16 and fits in the first tubular connector member 16. The annular valve seat 70 is arranged and fixed relative to the second tubular connector member 18 such that the valve element 68 is received by the second tubular connector member 18 when disengaged from the annular valve seat 70, to allow a flow of fluid when the second tubular connector member 18 is inserted in the first tubular connector member 16, as shown in FIG. 9, and the valve element 68 is received by the annular valve seat 70 to prevent a flow of fluid when the second tubular connector member 18 is separated from the first tubular connector member 16, as shown in FIG. 10.

The valve element 68 has a large diameter portion and a small diameter portion connected by a step on the front side of the large diameter portion. In this case, the large diameter portion is engageable with the annular valve seat 70. The annular seal 78 is carried on the step. The small diameter portion is smaller than the annular valve seat 70 and extends beyond the annular seat 70 and is engageable with the second tubular connector member 18. As shown in FIG. 11, a ring shaped portion 74 and spokes 76 are provided at the front end of the small diameter portion of the valve element 68 to come into contact with the second tubular connector member 18.

As will be apparent, the check valve allows a fluid flow when the second tubular connector member 18 is inserted in the first tubular connector member 16, as shown in FIG. 9, and prevents a fluid flow from the hose 20 toward the second tubular connector member 18 when the second tubular connector member 18 is disengaged from the first tubular connector member 16, as shown in FIG. 10.

FIGS. 14 to 21 show the fourth embodiment of the present invention. The swivelable connector 10 comprises a first tubular connector member 16, a second tubular connector member 18, a resilient retainer 24, a cylindrical pawl release member 58, and a check valve 68, fundamentally similar to those in the previous embodiment. The first tubular connector member 16 is constituted from two threaded tubular members 16a and 16b.

In this embodiment, a pawl release assist means is provided to assist the cylindrical pawl release member 58. Turning again to the arrangement of FIG. 6, disconnection can be carried out by driving the cylindrical pawl release member 58 to spread the pawls 44 and to disengage the pawls 44 from the annular groove 48, and by separating the second tubular connector member 18 from the first tubular connector member 16. In this disconnection, if the operator releases the once driven cylindrical pawl release member 58, the cylindrical pawl release member 58 may be forced back by the restoring force of the resilient retainer 24 and engage again in the annular groove 48, making it difficult to carry out the disconnection, and therefore, the cylindrical pawl release member 58 must be held in the advanced position by hand. The operator is required to grasp the first tubular connector member 16 and also hold the cylindrical pawl release member 58 in the left hand, for example, and to pull on the second tubular connector member 18 with the right hand.

Figure 14:
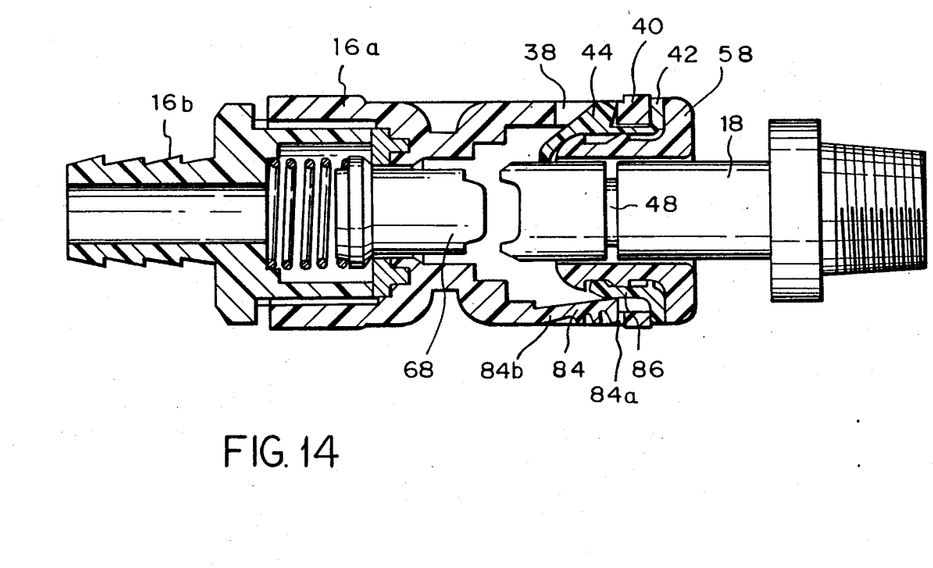
FIG. 14 is a sectional view of a swivelable connector according to the fourth embodiment of the present invention, with a manually operable tab of the first tubular connector member and associated parts rotated by 90 degrees.
Figure 15:
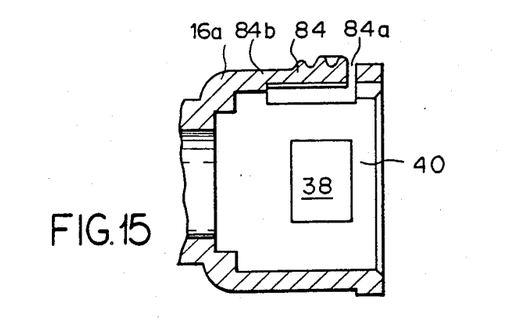
FIG. 15 is a sectional view of the first tubular connector member of FIG. 14.
Figure 16:
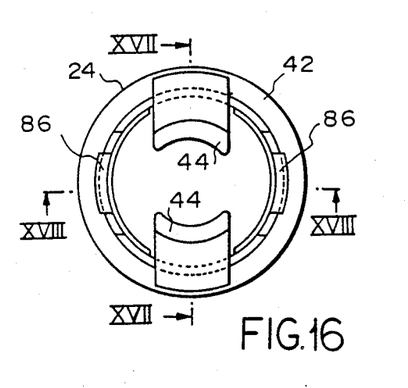
FIG. 16 is a front elevational view of the retainer of FIG. 14.
Figure 17:
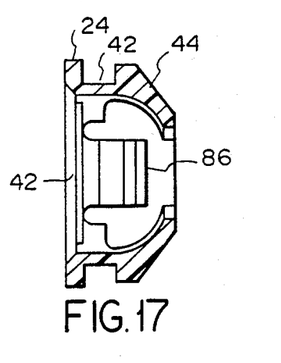
FIG. 17 is a sectional view of the retainer of FIG. 16, taken along the line XVII—XVII in FIG. 16.

According to the fourth embodiment, the first tubular connector member 16 includes at least one, preferably a pair, of wall portions 84, each encircled by a slit 84a and connected to the first tubular connector member 16 by an integral bridge 84b, as shown in FIGS. 14 and 15. Therefore, the wall portion 84 can be pressed by the operator and resiliently deformed to engage with the cylindrical pawl release member 58, to maintain it in an advanced pawl open position. The wall portion 84 is positioned at right angles to the apertures 38 for the pawls 44, as can be seen in FIG. 15. (Note, the wall portion 84 in FIG. 14 is rotated 90 degrees from the actual position relative to the apertures 38 to simultaneously illustrate the aperture 38 and the wall portion 84.)

Figure 18:
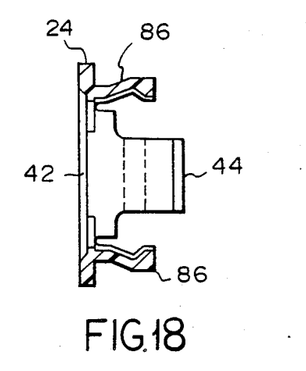
FIG. 18 is a sectional view of the retainer of FIG. 16, taken along the line XVIII—XVIII in FIG. 16.
Figure 19:
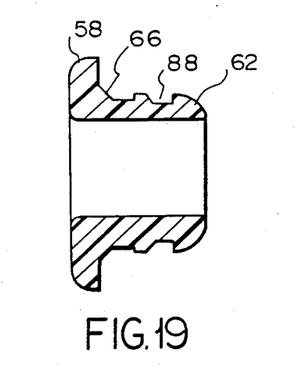
FIG. 19 is a sectional view of the pawl releasing tubular member of FIG. 14.

As shown in FIGS. 14, 16, 17 and 18, the retainer 24 preferably includes a pair of deformable legs 86 extending from the cylindrical base portion 42 and positioned at right angles to the pawls 44, in correspondence to the position of the wall portion 84 relative to the apertures 38. As shown in FIG. 18, the deformable legs 86 extend generally perpendicular to the cylindrical base portion 42, and the pawls 44 extend radially inward. Therefore, the deformable legs 86 do not come in contact with the second tubular connector member 18 unless they are pressed inward. Also, as shown in FIG. 19, the cylindrical pawl release member 58 has an annular groove 88 formed near the tapered tip 62 thereof.

Figure 20:
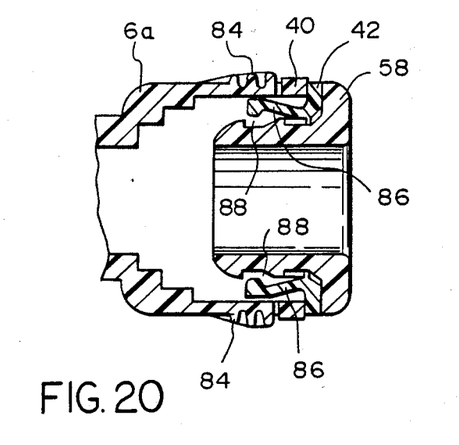
FIGS. 20 and 21 are sectional views of the swivelable connector of FIG. 14 under different operative conditions.
Figure 21:
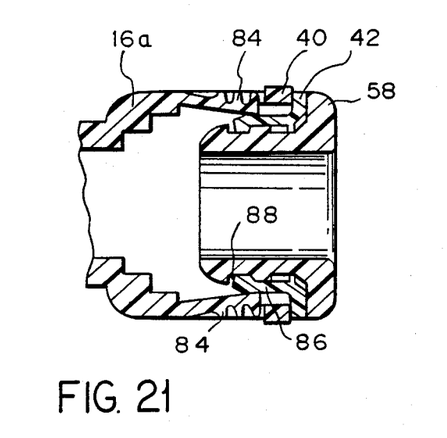

With this arrangement, the connecting work can be done in a manner described above. In the disconnecting work, the cylindrical pawl release member 58 is driven to spread the pawls 44, for example, by the right hand of the operator, while the left hand is grasping the first tubular connector member 16. FIG. 20 shows this condition (the second tubular connector member 18 is omitted in FIGS. 21 and 22). Then the operator pinches the wall portions 84 to press them inward, and these in turn press the deformable legs 86 of the retainer 24 to bring them into engagement in the annular groove 88 of the cylindrical pawl release member 58, as shown in FIG. 21. The cylindrical pawl release member 58 is retained at the advanced pawl open position after the operator releases the cylindrical pawl release member 58 with the right hand, and the operator can then separate the second tubular connector member 18 from the first tubular connector member 16.

Figure 22:
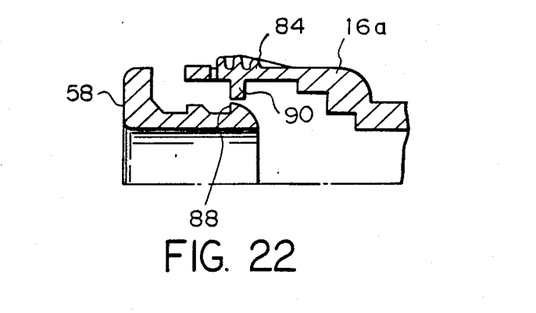
FIGS. 22 and 23 are sectional views of a modified first tubular connector member under different operative conditions; and, FIG. 24 is a sectional view of a further modified first tubular connector member.
Figure 23:
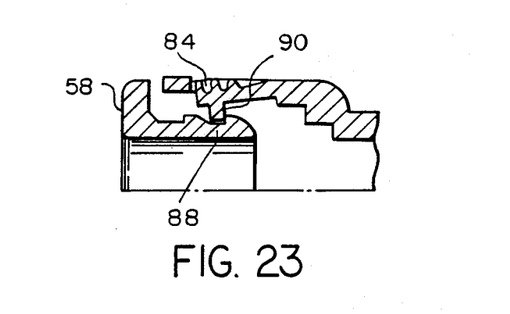

FIGS. 22 and 23 show a modified first tubular connector member 16a which has a pair of wall portions 84. In this example, the wall portions 84 have inward tips 90 which can directly engage in the annular groove 88 of the cylindrical pawl release member 58, to carry out the disconnection in the manner described above.

Figure 24:
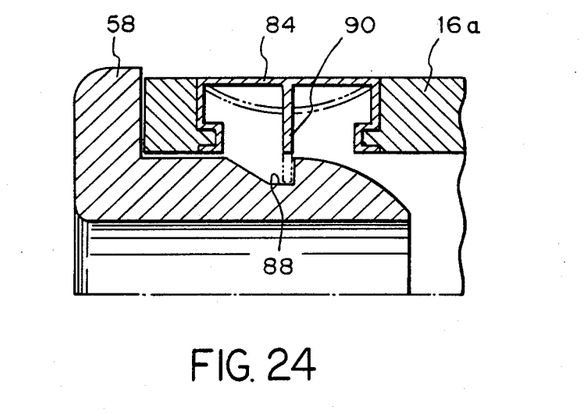

FIG. 24 shows a further modified first tubular connector member 16a which has a pair of wall portions 84. In this example, the wall portions 84 are formed of a resilient material and are attached to the first tubular connector member 16a. The wall portions 84 have inward tips or legs 90 which can directly engage in the annular groove 88, similar to the previous example.

I claim:
1. A swivelable connector for use with tubular conduits, comprising:
 a first tubular connector member having a first end portion adapted to be connected to a tubular conduit and a second end portion with means for forming a plurality of apertures therein, said means for forming said apertures including a cylindrical wall at an outer end of said second end portion;

a second tubular connector member having a first end portion inserted in said second end portion of said first tubular connector member, a second end portion adapted to be connected to a further tubular conduit, and means for forming an annular groove on an outer surface thereof at said first end portion;

annular sealing means arranged between said first tubular connector member and said second tubular connector member on a side inward from said annular groove;

retaining means carried in said cylindrical wall of said first tubular connector member for resiliently engaging in said annular groove of said second tubular connector member for retaining said second tubular connector member in said first tubular connector member, said retaining means being at least partly insertable in said apertures to allow said retaining means to be resiliently deformed when in contact with the outer surfaces of said second tubular connector member within said first tubular connector member during an insertion of said second tubular connector member into said first tubular connector member;

a check valve provided in said first tubular connector member on the inside relative to said second tubular connector member, said check valve comprising a movable valve element in said first tubular connector member, a spring urging said valve element toward said second tubular connector member, an annular valve seat in said first tubular connector member for receiving said valve element, said annular valve seat being arranged relative to said second tubular connector member such that said valve element is received by said second tubular connector member at a position at which it is disengaged from said annular valve seat to allow a flow of fluid when said second tubular connector member is inserted in said first tubular connector member and said valve element is received by said annular valve seat to prevent a flow of fluid when said second tubular connector member is separated from said first tubular connector member;

said valve element having a large diameter portion and a small diameter portion connected by a step, said large diameter portion being engageable with said annular valve seat, said small diameter portion extending beyond said annular valve seat and engageable with said second tubular connector member;

said annular valve seat being a separate member from and fits in said first tubular connector member and carries an annular seal for a sealing between said first tubular connector member and said annular valve seat, and an annular seal engageable with said valve element and said annular valve seat; and an annular seal arranged between said annular valve seat and said second tubular connector member for said annular sealing means arranged between said first tubular connector member and said second tubular connector member.

2. A swivelable connector for use with tubular conduits, comprising:
a first tubular connector member having a first end portion adapted to be connected to a tubular conduit and a second end portion with means for forming a plurality of apertures therein, said means for forming said apertures including a cylindrical wall at an outer end of said second end portion;

a second tubular connector member having a first end portion inserted into said second end portion of said first tubular connector member, a second end portion adapted to be connected to a further tubular conduit, and means for forming an annular groove on an outer surface thereof at said first end portion;

annular sealing means arranged between said first tubular connector member and said second tubular connector member on a side inward from said annular groove;

retaining means carried in said cylindrical wall of said first tubular connector for resiliently engaging with said annular groove of said second tubular connector member for retaining said second tubular connector member in said first tubular connector member, said retaining means being at least partly insertable into said apertures to allow said retaining means to be resiliently deformed when in contact with said outer surfaces of said second tubular connector member within said first tubular connector member during an insertion of said second tubular connector member into said first tubular connector member;

said retaining means comprising a cylindrical base portion adapted to fit in said cylindrical wall of said first tubular connector member and a plurality of pawls extending from said cylindrical base portion for resiliently engaging in said annular groove of said second tubular connector member, each of said pawls including a radially extending portion insertable in each of said apertures; and said cylindrical base portion of said retaining means including a radially outward flange, said flange and said radially extending portion of each of said pawls constituting an annular attachment groove on an outer surface of said cylindrical base portion engageable with said cylindrical wall of said first tubular connector member to secure said retaining means to said first tubular connector member.

3. A connector according to claim 2, wherein the number of said pawls and said apertures is two.

4. A connector according to claim 2, wherein said cylindrical base portion is slit to increase resiliency and facilitate the fitting of said retaining means to said first tubular connector member.

5. A connector according to claim 2, wherein a cylindrical pawl release member is slidably inserted in said cylindrical base portion of said retaining means and on said second tubular connector member, said cylindrical pawl release member having a tapered tip for radially spreading said pawls by driving said cylindrical pawl release member to thereby release said pawls from said annular groove of said second tubular connector member.

6. A connector according to claim 5, wherein said cylindrical base portion of said retaining means includes a radially inward tab for securing said cylindrical pawl release member in position.

7. A connector according to claim 5, wherein said cylindrical pawl release member includes a manual handling wheel at the outer end thereof.

8. A connector according to claim 5, wherein said first tubular connector member includes a deformable wall portion for maintaining said cylindrical pawl release member in a pawl open position by manually pressing on said deformable wall portion.

9. A connector according to claim 8, wherein said deformable wall portion comprises a wall portion of said first tubular connector member, encircled by a slit means and connected to said first tubular connector member by an integral bridge.

10. A connector according to claim 9, wherein said deformable wall portion is directly engaged with said cylindrical pawl release member.

11. A connector according to claim 9, wherein said retaining means including a deformable leg extending from said cylindrical base portion and said cylindrical pawl release member includes an annular groove on the outer surface thereof, said deformable leg being engageable with said annular groove of said cylindrical pawl release member by manually pressing said deformable wall portion for maintaining said cylindrical pawl release member n a pawl open position.

12. A connector according to claim 8, wherein said deformable wall portion comprises a resilient wall member attached to said first tubular connector member.

13. A connector according to claim 12, wherein said deformable wall portion is directly engaged with said cylindrical pawl release member.

14. A connector according to claim 2, wherein a check valve is provided in said first tubular connector member on the inside relative to said second tubular connector member, said check valve comprising a movable valve element in said first tubular connector member, a spring urging said valve element towards said second tubular connector member, and an annular valve seat in said first tubular connector member for receiving said valve element, said annular valve seat being arranged relative to said second tubular connector member such that said valve element is received by said second tubular connector member at a position at which it disengaged from said annular valve seat to allow a flow of fluid when said second tubular connector member is inserted into said first tubular connector member and said valve element is received by said annular valve seat to prevent a flow of fluid when said second tubular connector member is separated from said first tubular connector member.

15. A connector according to claim 14, wherein said valve element has a large diameter portion and a small diameter portion connected by a step, said large diameter portion being engageable with said annular valve seat, said small diameter portion extending beyond said annular valve seat and engageable with said second tubular connector member.

16. A connector according to claim 15, wherein said annular valve seat is a separate member from and fits in said first tubular connector member and carries an annular seal for a sealing between said first tubular connector member and said annular valve seat, said valve element carrying an annular seal engageable with said annular valve seat.

17. A connector according to claim 16, wherein said annular seal is carried on said step.

18. A connector according to claim 17, wherein an annular seal is arranged between said annular valve seat and said second tubular connector member for said annular sealing means arranged between said first tubular connector member and said second tubular connector member.

19. A connector according to claim 15, wherein said annular valve seat is a separate member from and fits in said first tubular connector member and carries an annular seal for a sealing between said first tubular connector member and said annular valve seat and an annular seal engageable with said valve element.

20. A connector according to claim 19, wherein an annular seal is arranged between said annular valve seat and said second tubular connector member for said annular sealing means arranged between said first tubular connector member and said second tubular connector, member.

* * * * *